United States Patent
Milunas et al.

[11] Patent Number: 5,289,740
[45] Date of Patent: Mar. 1, 1994

[54] INFERENCE-BASED MANUAL PULLDOWN CONTROL OF AN AUTOMATIC TRANSMISSION

[75] Inventors: Rimas S. Milunas, Royal Oak; Larry T. Nitz, Troy; Susan L. Rees, Clawson; Nader Motamedi, Rochester Hills, all of Mich.

[73] Assignee: Saturn Corporation, Troy, Mich.

[21] Appl. No.: 844,055

[22] Filed: Mar. 2, 1992

[51] Int. Cl.$^5$ ............................................. F16H 61/02
[52] U.S. Cl. ................................... 74/866; 364/424.1
[58] Field of Search ........................ 74/866; 364/424.1

[56] References Cited

U.S. PATENT DOCUMENTS

| | | | |
|---|---|---|---|
| 4,648,291 | 3/1987 | Klatt et al. | 74/866 |
| 5,001,640 | 3/1991 | Matsumoto et al. | 364/426.02 |
| 5,019,979 | 5/1991 | Takahashi | 364/424.1 |
| 5,036,730 | 8/1991 | Sakai et al. | 74/866 |
| 5,054,336 | 10/1991 | Takizawa | 74/866 |
| 5,067,374 | 11/1991 | Sakai et al. | 74/866 |
| 5,079,705 | 1/1992 | Sakai et al. | 364/424.1 |
| 5,231,897 | 8/1993 | Morita | 74/866 |
| 5,235,875 | 8/1993 | Yoshida et al. | 74/866 |
| 5,241,476 | 8/1993 | Benford et al. | 364/424.1 |
| 5,841,815 | 6/1989 | Takahashi | 74/866 |

Primary Examiner—Dirk Wright
Attorney, Agent, or Firm—Mark A. Navarre

[57] ABSTRACT

A shift pattern control for a multiple speed ratio transmission wherein an inference-based control overrides the normal shift pattern to automatically achieve manual pulldown operation under conditions for which such operation would be advised and expected. The inference-based control is achieved with a fuzzy logic technique by which vehicle parameters influencing the desirability of manual pulldown operation are measured or estimated, and used to establish an aggregate measure of the overall need for engine braking and downshifting. In the preferred embodiment, the fuzzy logic parameters include vehicle speed, grade load, engine throttle position, time of braking and time of deceleration. The parameters are applied to membership functions to indicate the truthfulness of the specified conditions, and logical combinations of the truth indications are formed, weighted to reflect their criticality, and combined to form an aggregate measure of the overall need for pulldown operation.

16 Claims, 14 Drawing Sheets

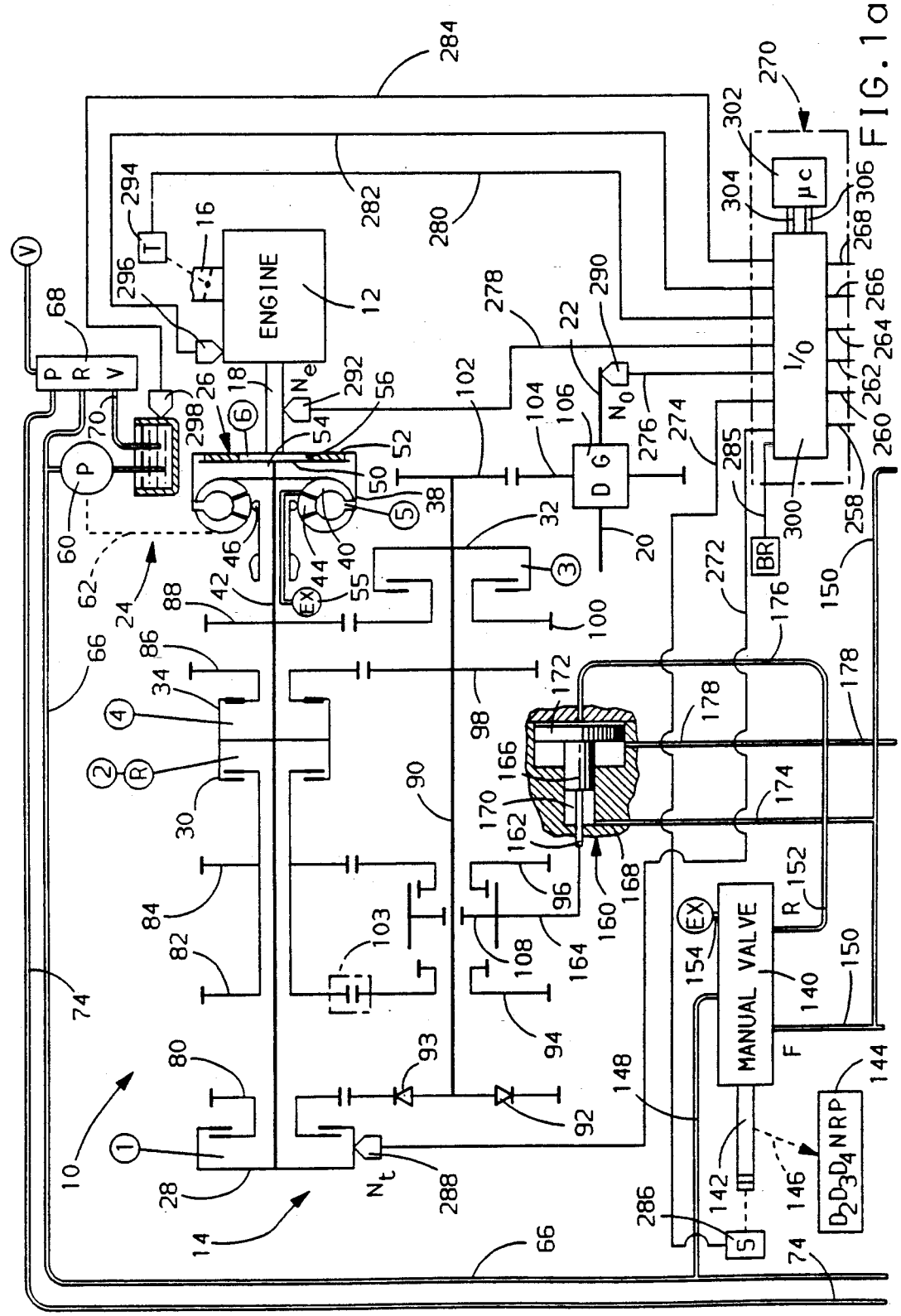

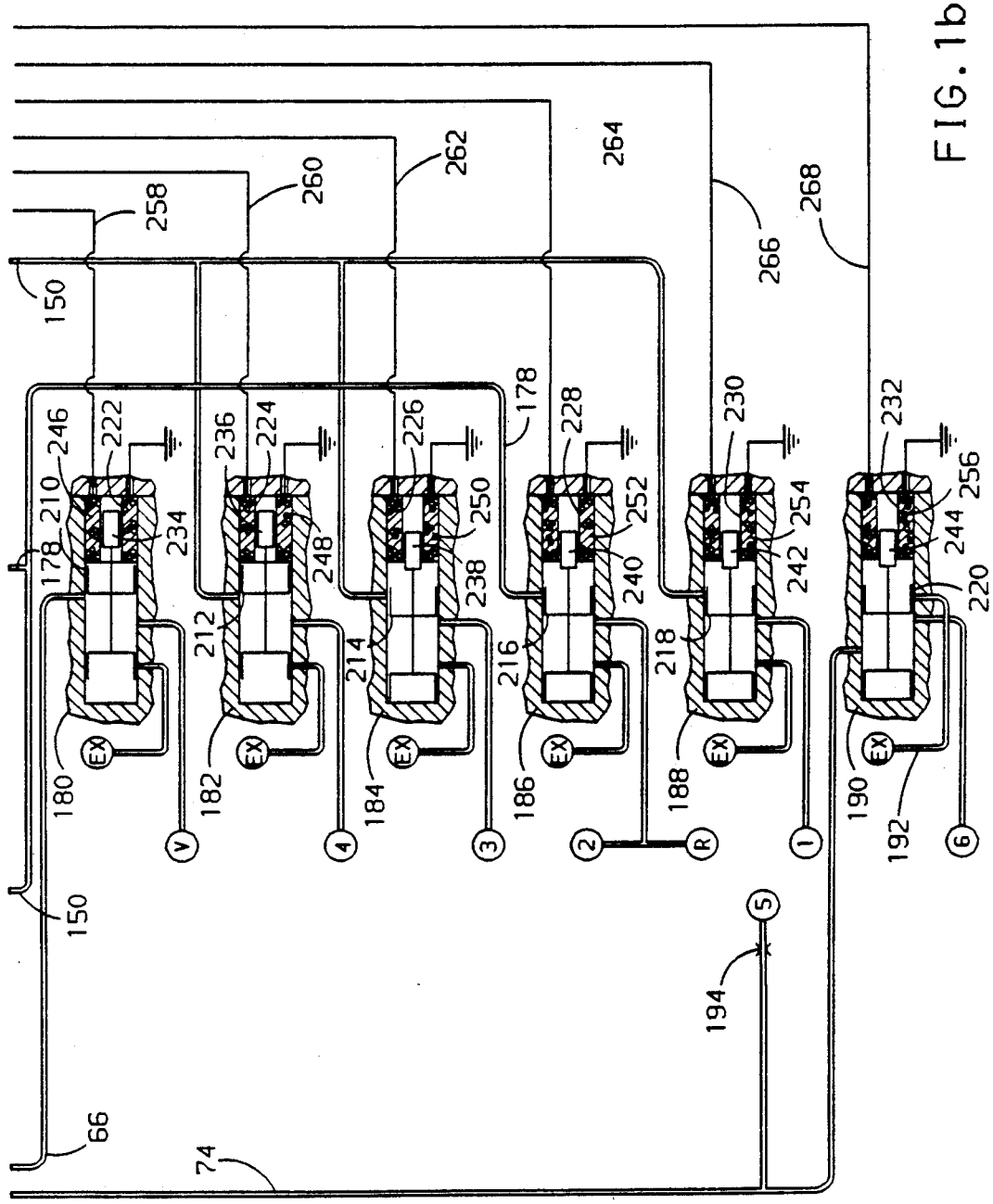

| RULE | TRUTH VALUE | WEIGHT | RESULT |
|---|---|---|---|
| 1 | 0.5 | 32 | 16 |
| 2 | 0.8 | 60 | 48 |
| 3 | 0.0 | 64 | 0 |
| 4 | 0.5 | 32 | 16 |
| 5 | 0.1 | 32 | 3.2 |
| | | TOTAL | 83.2 |
| | | TOTAL DIVIDED BY 64 | 1.3 |

INFERENCE-BASED MANUAL PULLDOWN CONTROL OF AN AUTOMATIC TRANSMISSION

This invention relates to speed ratio scheduling in a motor vehicle automatic transmission, and more particularly, to an inference-based override of the normal speed ratio schedule under conditions for which a manual pulldown would be suggested.

BACKGROUND OF THE INVENTION

Vehicles having automatic transmissions are typically equipped with a driver manipulated transmission range selector positionable to one of a number of sectors for indicating a desired operating range of the transmission. The forward operating range is defined by a Drive sector and one or more manual pulldown sectors corresponding to the various forward speed ranges provided by the transmission.

To operate the vehicle in a forward range, the selector is ordinarily moved to the Drive sector, and the speed ratio selection is carried out automatically in accordance with an empirically determined shift pattern based on engine load (throttle position) and vehicle speed. For any given engine load, for example, the shift pattern may dictate a first vehicle speed above which an upshift should be initiated, and a second vehicle speed below which a downshift should be initiated.

However, the predetermined shift pattern is not especially suited to operation in hilly terrain. During such operation, the driver is encouraged to move the range selector to a manual pulldown position. In addition to downshifting the transmission to the indicated speed ratio, the manual pulldown configures the transmission to enable engine braking and inhibits upshifting to a higher speed ratio.

SUMMARY OF THE PRESENT INVENTION

The present invention is directed to an improved shift pattern control for a multiple speed ratio transmission, wherein an inference-based control overrides the normal shift pattern to automatically achieve manual pulldown operation under conditions for which such operation would be advised and expected.

The inference-based control is achieved with a fuzzy logic technique by which vehicle parameters influencing the desirability of manual pulldown operation are measured or estimated, and used to establish an aggregate measure of the overall need for engine braking and downshifting. In the preferred embodiment, the fuzzy logic parameters include vehicle speed, grade load, engine throttle position, time of braking, time of deceleration, and coast-acceleration time. The parameters are applied to membership functions to indicate the truthfulness of the specified conditions, and logical combinations of the truth indications—such as low vehicle speed and high negative grade load—are formed, weighted to reflect their criticality, and combined to form an aggregate measure of the overall need for pulldown operation.

When the magnitude of the aggregate measure reaches predetermined thresholds, the control automatically initiates manual pulldown downshifting consistent with the severity of the driving conditions. When the driving conditions become less severe, the transmission is successively upshifted as the aggregate measure falls below the respective predetermined thresholds. The effect of the control is to automatically provide manual pulldown operation when and to an extent consistent with the vehicle operation. If the driver initiates a manual pulldown to a speed ratio lower than the inference-based speed ratio, the manual pulldown is given priority.

BRIEF DESCRIPTION OF THE DRAWINGS

FIGS. 1a–1b form a schematic diagram of an automatic transmission control according to this invention, including a computer-based control unit.

FIGS. 4, 6a–6b, 7a–7d, 8a–8b and 9 depict flow diagrams representative of computer program instructions executed by the computer-based control unit of FIG. 1a in carrying out the control of this invention.

DETAILED DESCRIPTION OF THE DRAWINGS

Figures 2, 4:
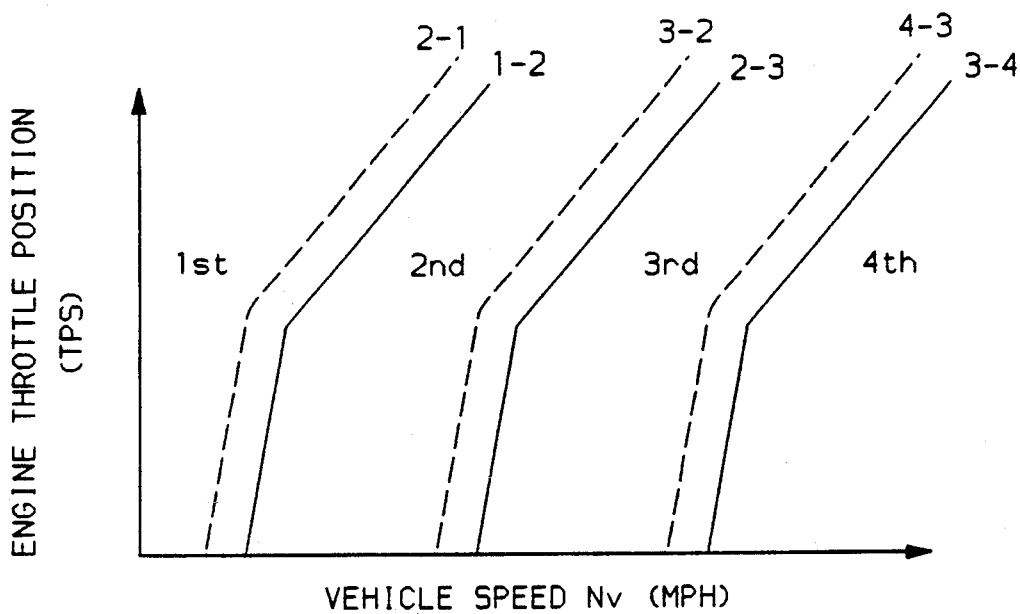
FIG. 2 is a graph depicting a conventional shift schedule for initiating shifting as a function of engine load (throttle position) and vehicle speed.
FIG. 4 is a table illustrating an example in which inference-based downshifting is desired.

Referring particularly to FIGS. 1a and 1b, the reference numeral 10 generally designates a motor vehicle drivetrain including an engine 12 and a parallel shaft transmission 14 having a reverse speed ratio and four forward speed ratios Engine 12 includes a throttle mechanism 16 mechanically connected to an operator manipulated device, such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26, also referred to herein as the torque converter clutch or TCC, comprising a clutch plate 50 connected to rotate with the turbine 40. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the TCC 26 to provide a mechanical drive connection in parallel with the torque converter 24. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56. A fluid exhaust line 55 returns fluid from the torque converter 24 to a cooler (not shown).

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the Schuster U.S. Pat. No. 4,342,545 issued Aug. 3, 1982, and a representative pressure regulator valve is disclosed in the Vukovich U.S. Pat. No. 4,283,970 issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized the ratio of the turbine speed $N_t$ to output speed $N_o$. Representative $N_t/N_o$ ratios for transmission 14 are as follows:

| First   | 2.368 | Second | 1.273 |
|---------|-------|--------|-------|
| Third   | 0.808 | Fourth | 0.585 |
| Reverse | 1.880 |        |       |

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68. The fluid valve 190 is controlled to direct fluid pressure from the PRV output line 74 to TCC 26. The directional servo 160 operates in response to the condition of the manual valve 140 and serves to properly position the dog clutch 108.

The manual valve 140 includes a shaft 142 for receiving axial mechanical input from a range selector 144 which is positioned by the operator of the motor vehicle to obtain a desired transmission gear range. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the range selector 144 is moved to the D4, D3 or D2 positions, line pressure from the line 148 is directed to the forward (F) output line 150.

When the range selector 144 is in the R position, line pressure from the line 148 is directed to the reverse (R) output line 152. When the range selector 144 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172.

When the range selector 144 is in a forward range position, the fluid pressure in the chamber 170 urges piston 166 rightward as viewed in FIG. 1 to engage the dog clutch 108 with the gear element 96 for enabling engagement of a forward speed ratio. When the range selector 144 is moved to the R position, the fluid pressure in chamber 172 urges piston 166 leftward as viewed in FIG. 1a to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60 or PRV 68, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 184 and 188 receive fluid pressure from the forward output line 150 of manual valve 140, and are controlled to direct variable amounts of such pressure to the clutching devices 34, 32 and 28, as indicated by the circled numerals 4, 3 and 1, respectively. The fluid valve 186 receives fluid pressure from the directional servo output line 178, and is controlled to direct a variable amount of such pressure to the clutching device 30, as indicated by the circled numeral 2 and the circled letter R.

The fluid valve 190 is adapted to alternately connect the release chamber 56 of torque converter 24 to fluid pressure line 74 and exhaust line 192, as indicated by the circled numeral 6. The apply chamber 54 of TCC 26 is supplied with fluid pressure from the fluid pressure line 74 via the orifice 194, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1b, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines.

Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse width modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

With respect to the TCC 26, open converter operation is achieved by deenergizing the coil 256 of fluid valve 190 so that the spool element 220 assumes the position depicted in FIG. 1b. In this case, the fluid pressure in line 74 is directed to the release chamber 56 of torque converter 24, creating a pressure differential across clutch plate 50 which disables engagement of TCC 26. The fluid supplied to release chamber 56 via valve 190 and the fluid supplied to apply chamber 54 via orifice 194 are both exhausted via exhaust line 55 of FIG. 1a.

When it is desired to engage the TCC 26, the coil 256 of valve 190 is pulse width modulated to lessen the fluid pressure in the release chamber 56 of torque converter 24. This creates a pressure differential across clutch plate 50 which moves the friction element 52 into engagement with input shell 38 to initiate TCC engagement.

While the fluid valves 180-190 have been illustrated as spool valves, other types of valves could be substituted therefor. By way of example, valves of the ball and seat type could be used. In general terms, the fluid valves 180-190 may be mechanized with any three-port pulse width modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284. Finally, a brake switch BR provides an indication of service brake application on line 285.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse width modulation signals, and a microcomputer 302 which communicates with the I/O device 300 via an address-and-control bus 304 and a bi-directional data bus 306. Flow diagrams representing suitable program instructions for developing the pulse width modulation outputs in accordance with the teachings of this invention are depicted in FIGS. 5-9.

As indicated above, the present invention is directed to an inference-based control of the shift scheduling which provides improved control when operating the vehicle in hilly terrain. The base or default shift scheduling is performed by table look-up as graphically depicted in FIG. 2. For any engine throttle position TPS, the table provides an upshift vehicle speed above which an upshift to the next higher speed ratio is desired, and a downshift vehicle speed below which a downshift to the next lower speed ratio is desired.

The shift schedule of FIG. 2 provides adequate control of transmission shifting while the vehicle is operating in relatively flat terrain, but may result in unnecessary shifting and excessive brake usage when operating in hilly terrain. When ascending a hill, the normal shift schedule yields an appropriate speed ratio by downshifting, if necessary, as the driver increases the engine throttle setting to maintain a given speed, but generates an upshift at the crest of the hill when the driver reduces the throttle setting. The upshift effectively obviates engine braking effects, and the operator must then rely on the service brakes to regulate vehicle speed while going down the hill. A similar situation occurs when driving on a winding ascent; that is, the transmission upshifts when the driver reduces the throttle setting upon entering a curve, necessitating a subsequent downshift after negotiating the curve.

To avoid inappropriate shifting and excessive braking when driving in hilly terrain, the driver is encouraged to move the range selector 144 to one of the manual pulldown positions D3, D2 or D1, thereby downshifting the transmission to the indicated speed ratio. In this mode, the transmission will not upshift beyond the indicated speed ratio, and engine braking is available.

An experienced driver may initiate manual pulldown shifting several times in the course of a few miles in hilly terrain, but inexperienced drivers tend to leave the range selector 144 in the Drive position regardless of the terrain.

The present invention is directed to a shift control which supplements the normal shift schedule to automatically provide manual pulldown operation when driving in hilly terrain, based on information inferred from various vehicle operating parameters. For example, the control unit may infer the need for a manual pulldown when low vehicle speed and highly negative grade occur concurrently. A number of such parameter combinations, referred to herein as control rules, are monitored during the course of vehicle operation. When the need for manual pulldown operation is sufficiently great, the control unit overrides the normal shift schedule, effectively initiating manual pulldown operation.

Figure 3A:
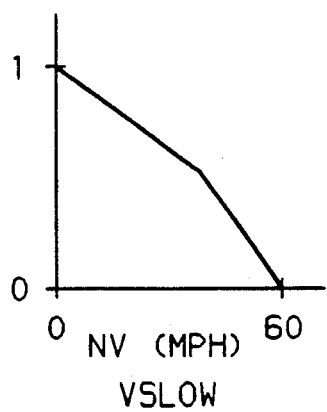
FIGS. 3a–3f graphically depict representative membership functions for the inference-based parameters used according to this invention.
Figure 3B:
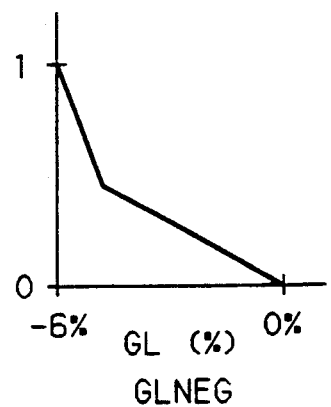
Figure 3C:
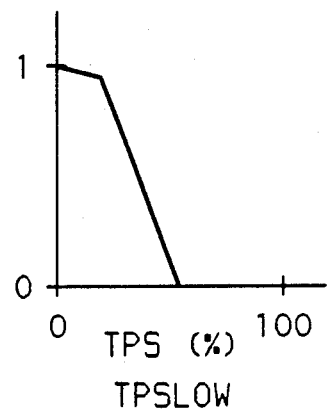
Figure 3D:
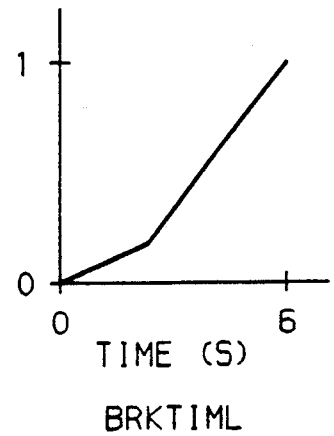
Figure 3E:
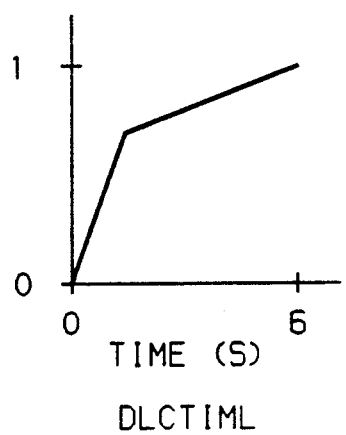
Figure 3F:
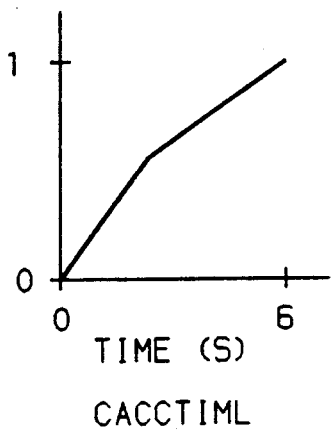

In the illustrated embodiment, the control unit 270 utilizes five control rules: (1) low vehicle speed (VSLOW) AND large negative grade (GLNEG); (2) large negative grade AND low throttle setting (TPSLOW); (3) low vehicle speed AND large negative grade AND long brake time (BRKTIML); (4) low vehicle speed AND long deceleration time (DECTIML); and (5) low vehicle speed AND long deceleration time AND long coast acceleration time (CACCTIML). The degree of truthfulness of the individual parameter conditions are determined by table look-up, as graphically illustrated by graphs of FIGS. 3a-3f. In each case, the degree of truthfulness is represented by a numerical result, referred to herein as a truth value, between zero (no truthfulness) and one (high truthfulness). In the VSLOW table of FIG. 3a, for example, the numerical result is one at 0 MPH, decreasing with increasing speed, and zero for speeds of 60 MPH or higher.

Once the truth values for the various parameters are determined, they are applied to the control rules defined above to produce a truth value result for each control rule. For example, if the truth values of "low vehicle speed" and "large negative grade" were 0.6 and 0.9, respectively, the truth value of the first control rule would be the lower of the truth values or 0.6. The control rule truth values are weighted to account for their criticality, and then summed to form an overall result which determines if, and to what extent, manual pulldown shifting is appropriate.

The table of FIG. 4 illustrates an example where weighting factors are applied to five control rule values to form an overall result of 83.2. In this example, a result of 64 or higher indicates the need for a single ratio manual pulldown—that is, to the D3 quadrant. Similarly, a result of 128 or higher indicates the need for a manual pulldown to the D2 quadrant, and a result of 192 or higher indicates the need for a manual pulldown to the D1 quadrant. In the illustrated example, the inference-based control would thus initiate manual pulldown to the D3 quadrant. In the illustrated embodiment, no individual control rule value can be high enough to initiate manual pulldown operation (that is, each is less than 64), requiring some truthfulness of more than one control rule. In other applications, it may be desirable to give certain control rules more authority.

The above-described control results in a shift control system that does not downshift or upshift at distinct speeds, grades or acceleration levels. Rather, manual pulldown shifting occurs when the preponderance of the inferences indicates that manual pulldown operation should occur.

Figure 5:
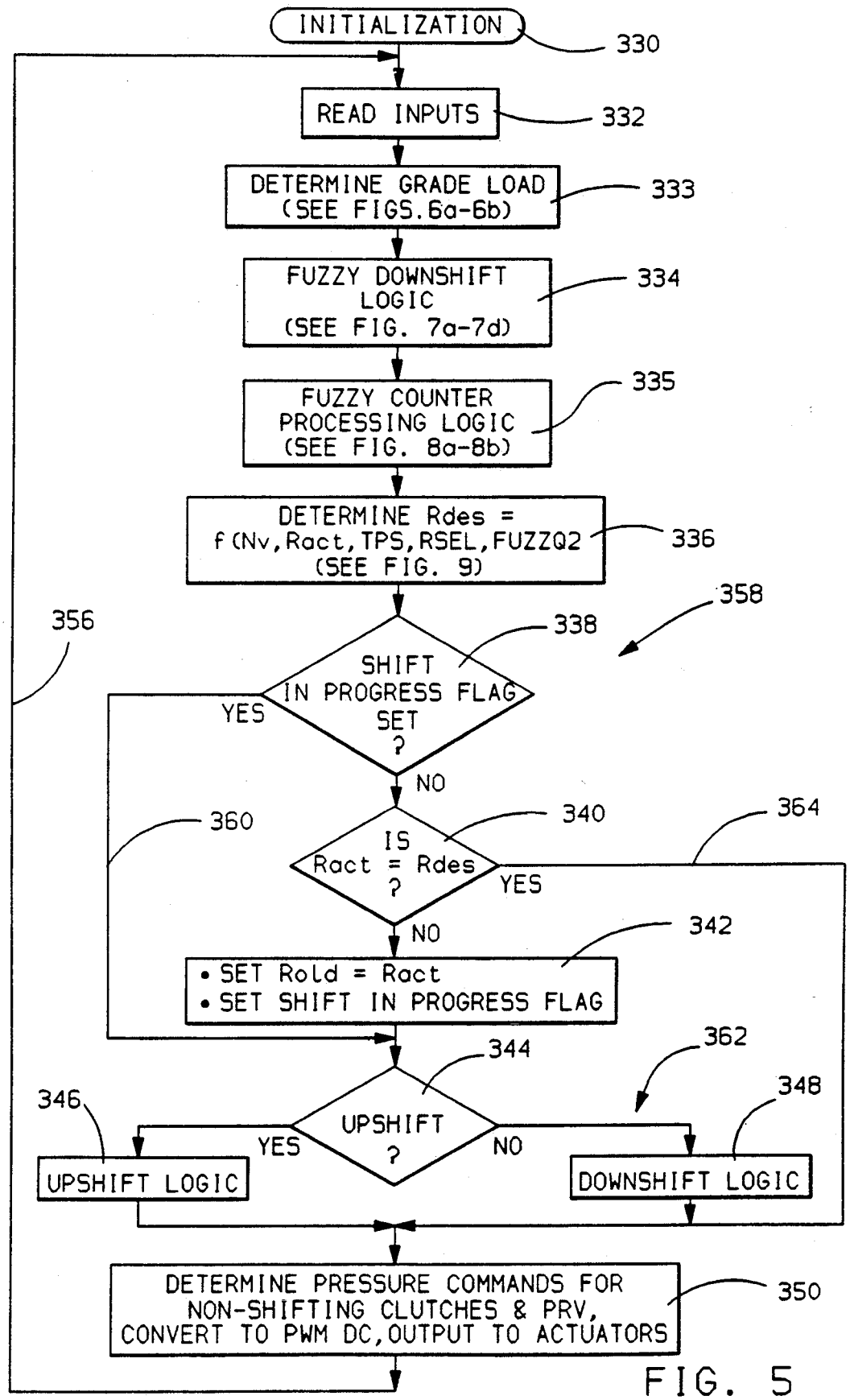

The flow diagrams of FIGS. 5, 6a-6b, 7a-7d, 8a-8b and 9 represent program instructions to be executed by the microcomputer 302 of control unit 270 in mechanizing the ratio shifting control of this invention. The flow diagram of FIG. 5 represents a main or executive program which calls various subroutines for executing particular control functions as necessary. The flow diagrams of FIGS. 6a–6b, 7a–7d, 8a–8b and 9 represent the functions performed by those subroutines which are pertinent to the present invention.

Referring to the main loop program of FIG. 5, the reference numeral 330 designates a set of program instructions executed at the initiation of each period of vehicle operation for initializing the various tables, timers, etc., used in carrying out the control functions of this invention. Following such initialization, the instruction blocks 332–354 are repeatedly executed in sequence, as designated by the flow diagram lines connecting such instruction blocks and the return line 356. Instruction block 332 reads and conditions the various input signals applied to I/O device 300 via the lines 272–285, and calculates various terms used in the control algorithms, including the input torque Ti, the torque variable Tv and the seed ratio No/Ni.

Figure 6A:
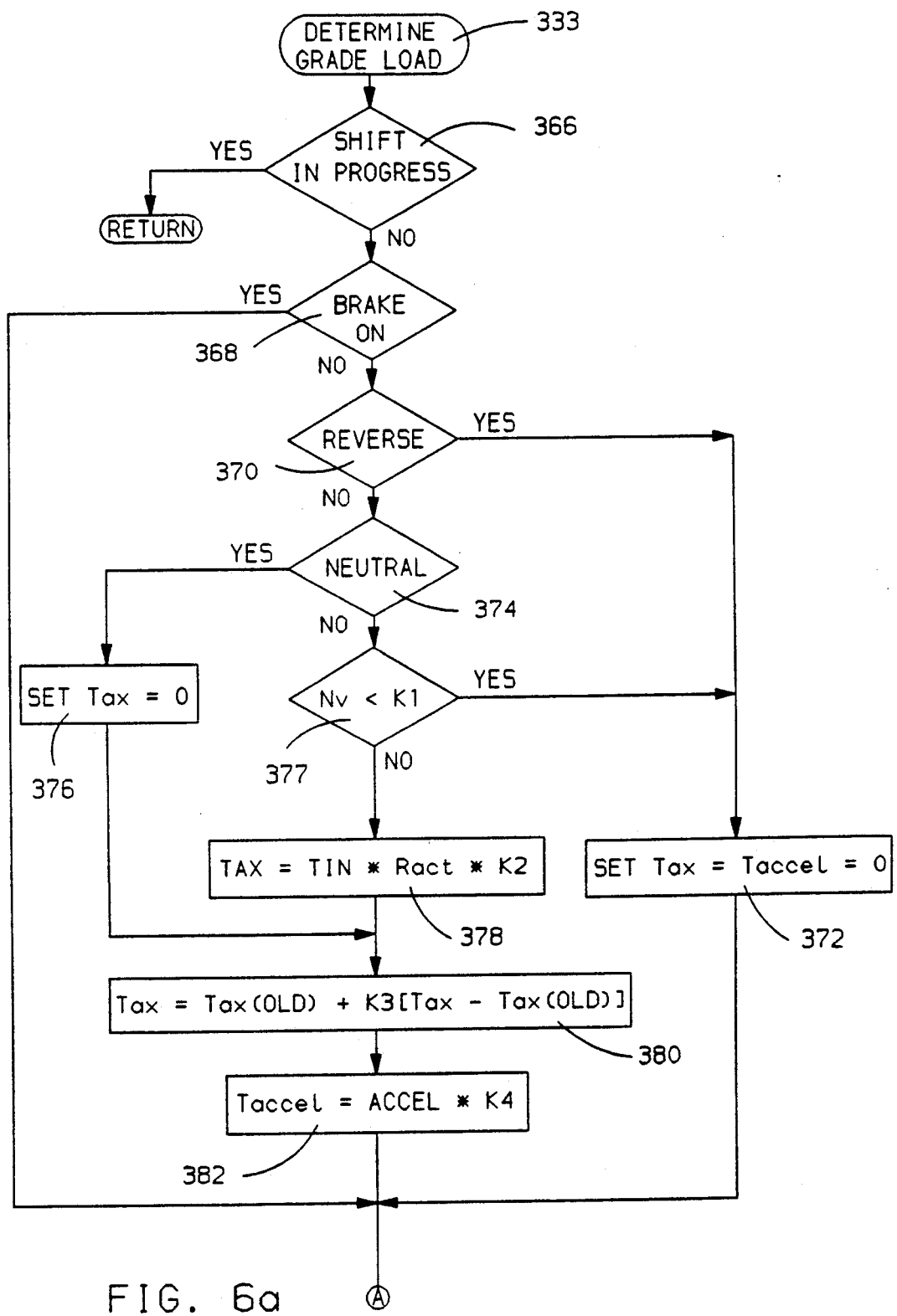
Figure 6B:
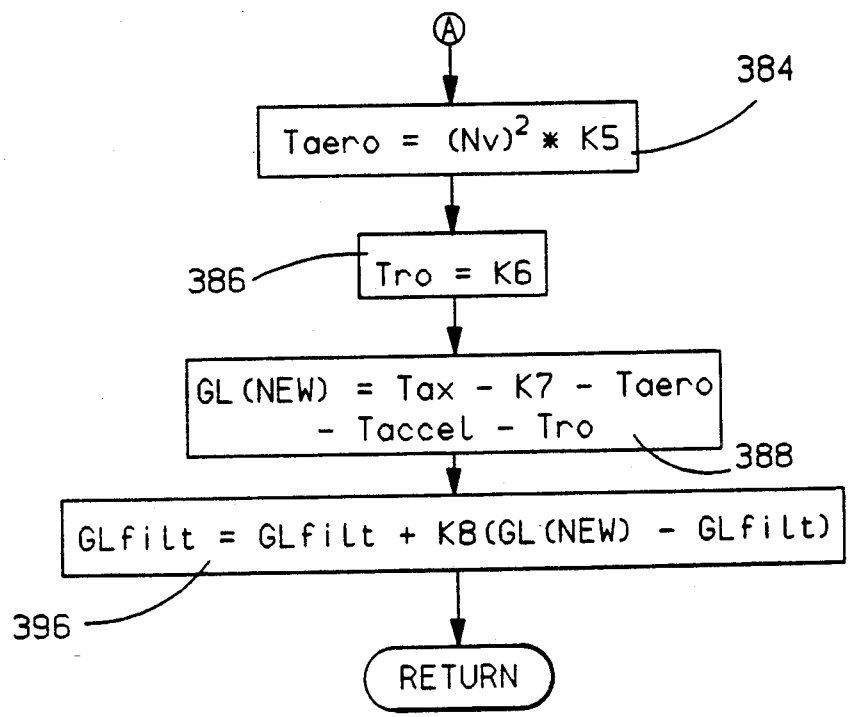
Figure 7A:
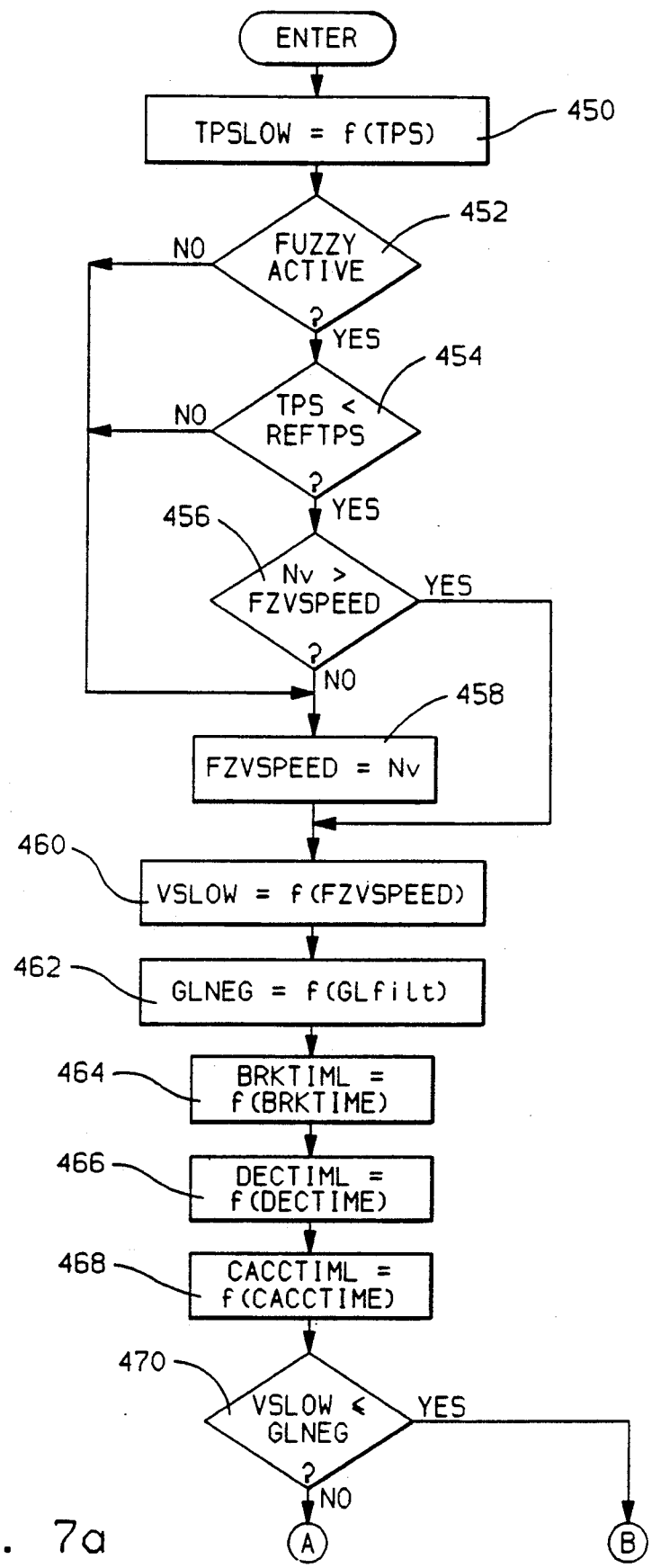
Figure 7B:
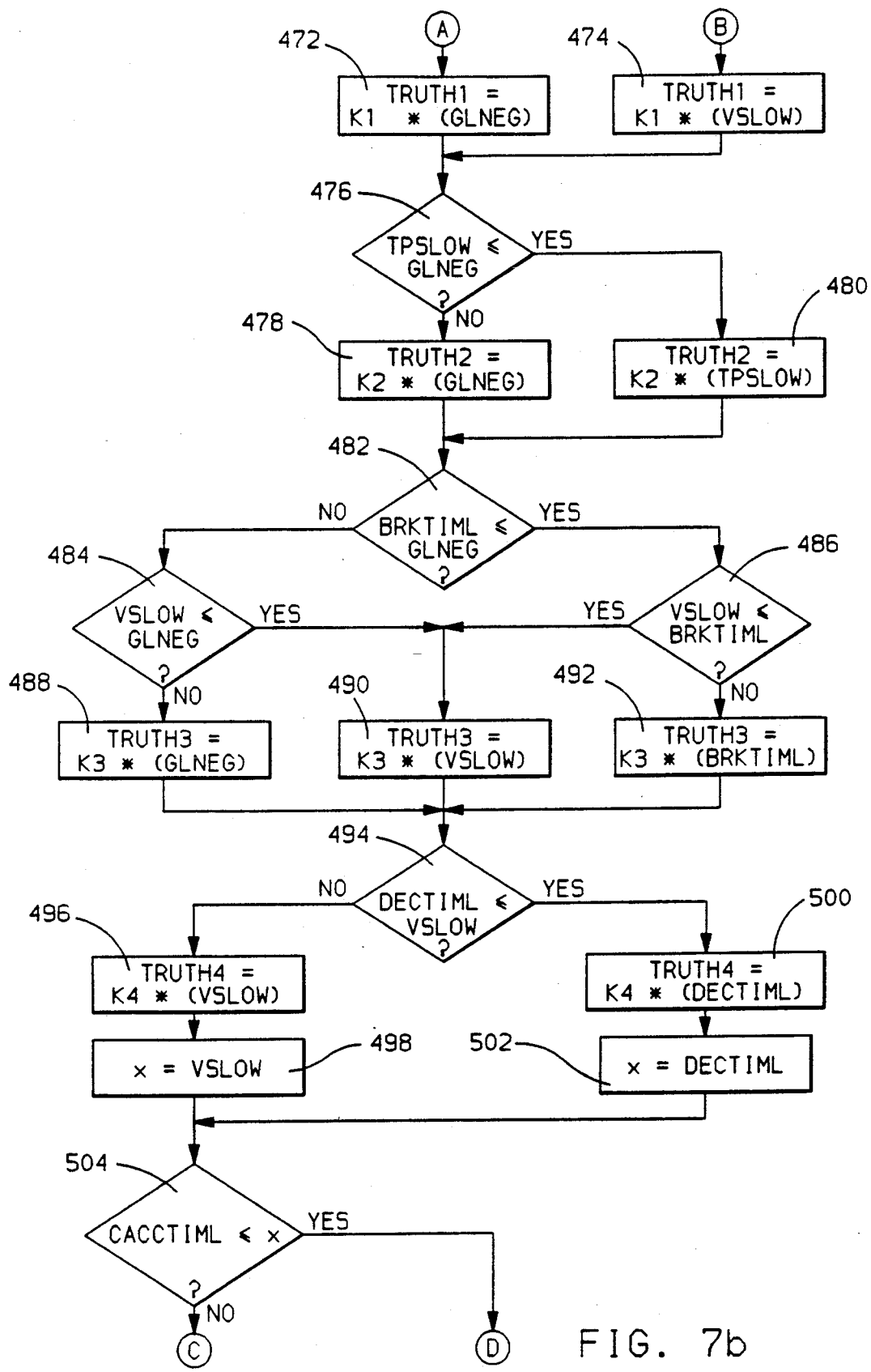
Figure 7C:
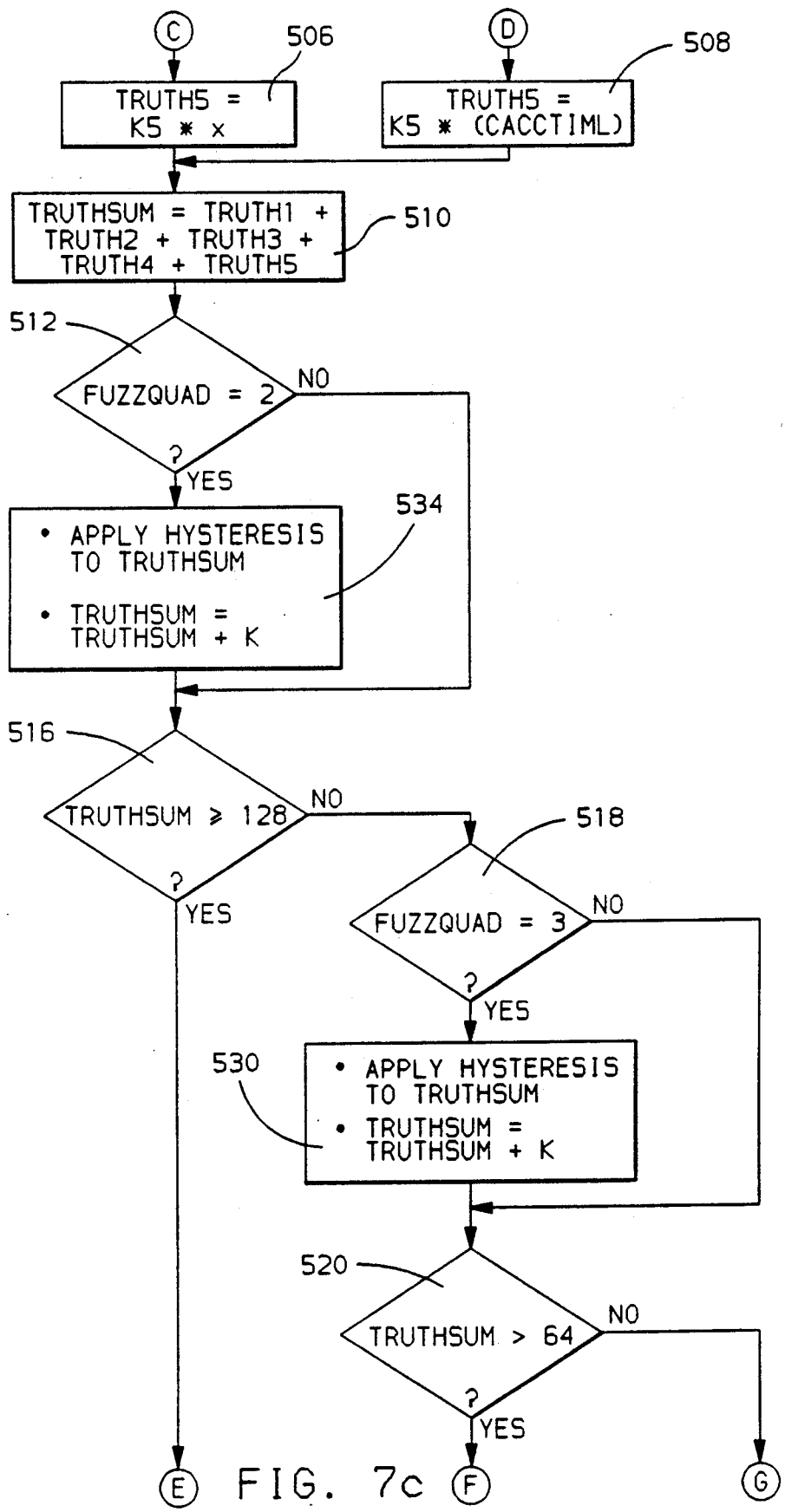
Figure 7D:
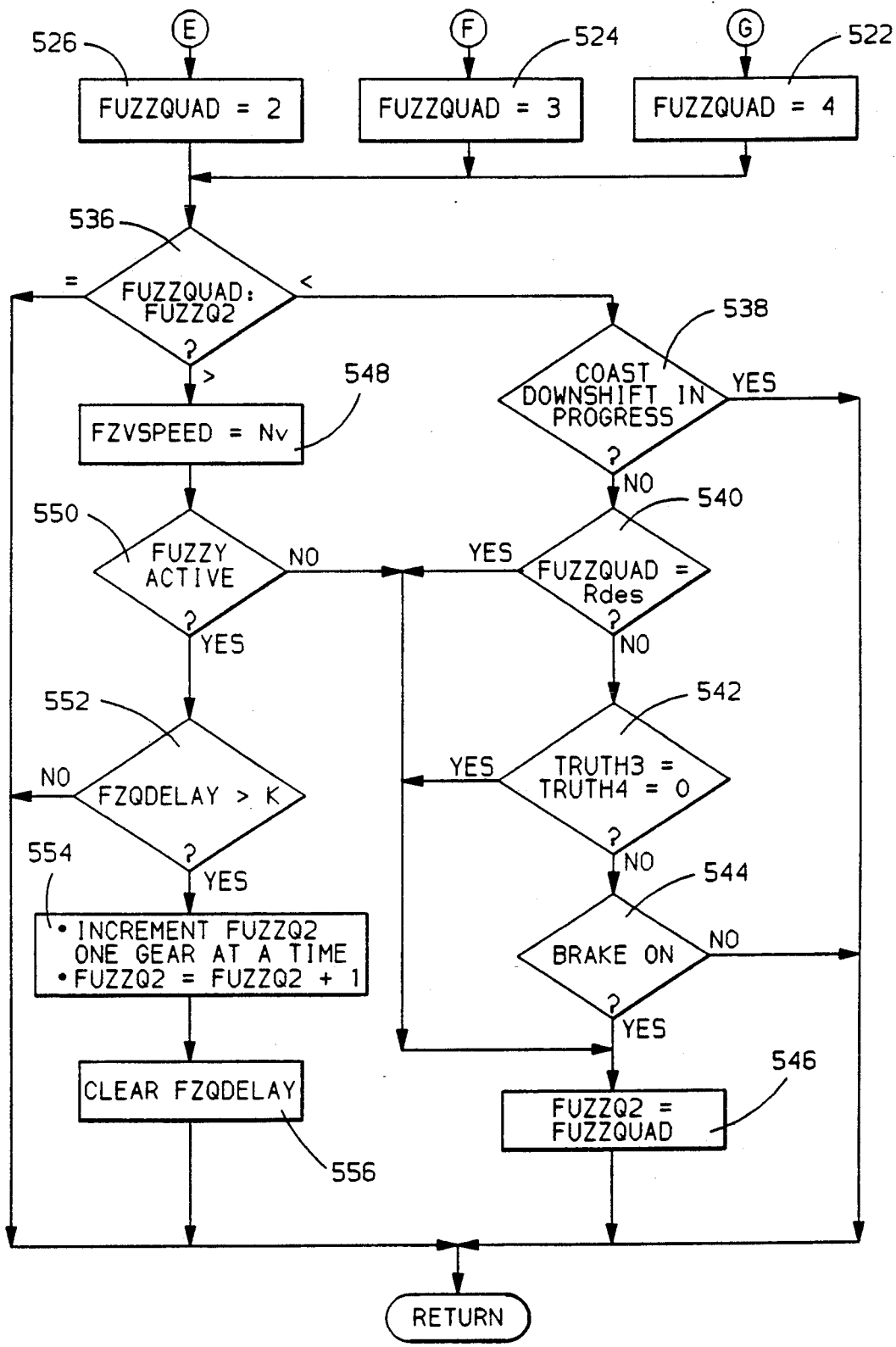

The block 333 determines the grade load GL, as described above, and is set forth in detail in the flow diagram of FIGS. 6a–6b, as indicated. The block 334 detail in the flow diagram of FIGS. 7a–7d as indicated. The block 335 pertains to Fuzzy Counter Processing Logic, and is set forth in detail in the flow diagram of FIGS. 8a–8b as indicated. The block 336 determines the desired speed ratio, Rdes, in accordance with a number of inputs including present ratio Ract, throttle position TPS, vehicle speed Nv, range selector position RSEL, and the inference-based pulldown considerations, and is set forth in detail in the flow diagram of FIG. 9, as indicated.

The blocks designated by the reference numeral 358 include the decision block 338 for determining if a shift is in progress, as indicated by the "SHIFT IN PROGRESS" flag; the decision block 340 for determining if the actual speed ratio Ract (that is, No/Nt) is equal to the desired speed ratio Rdes determined at instruction block 336; and the instruction block 342 for setting up the initial conditions for a ratio shift. The instruction block 342 is only executed when decision blocks 338 and 340 are both answered in the negative. In such case, instruction block 342 serves to set the old ratio variable (Rold) equal to Ract and to set the "SHIFT IN PROGRESS" flag. If a shift is in progress, the execution of blocks 340 and 342 is skipped, as indicated by the flow diagram line 360. If no shift is in progress, and the actual ratio equals the desired ratio, the execution of instruction block 342 and the blocks designated by the reference numeral 362 is skipped, as indicated by the flow diagram line 364.

The blocks designated by the reference numeral 362 include the decision block 344 for determining if the shift is an upshift or a downshift; the instruction block 346 for developing pressure commands for the on-coming and off-going clutches if the shift is an upshift; and the instruction block 348 for developing the pressure commands for the on-coming and off-going clutches if the shift is a downshift. Instruction block 350 determines pressure commands for the PRV and the non-shifting clutches, converts the commands to a PWM duty cycle based on the operating characteristics of the various actuators, and energizes the actuator coils accordingly. The development of suitable pressure commands and PWM duty cycle control given a desired speed ratio is described in detail in the U.S. Pat. No. 4,653,350 to Downs et al., issued on Mar. 31, 1987, and assigned to General Motors Corporation.

Referring to the grade load determination flow diagram of FIGS. 6a–6b, the decision block 366 is first executed to determine if a shift is in progress. If so, the remainder of the routine is skipped. If the service brake is depressed, as determined at block 368, the execution of blocks 370–382 is skipped to freeze the current values of Tax and Taccel. If the transmission range selector 142 is in Reverse, as determined at block 370, the block 372 is executed to set the axle and acceleration torque terms Tax and Taccel to zero. If the range selector 142 is in Neutral, as determined at block 374, the block 376 is executed to set the axle torque term Tax to zero. The axle and acceleration torque terms Tax and Taccel are also zeroed if the vehicle speed Nv is less than a predefined value K1, such as 20 MPH, as determined at block 377.

The blocks 378–382 determine the non-zero values of the axle and acceleration torque terms Tax and Taccel. The axle torque Tax is determined according to the expression:

$$Tax = Tin * Ract * K2$$

and then subjected to a first order lag filter, as indicated at block 380. The acceleration torque term is determined according to the expression:

$$Taccel = K4 * d(Nv)/dt$$

where K4 represents the nominal vehicle weight and d(Nv)/dt represents the acceleration of the vehicle.

The aerodynamic and rolling resistance torque terms Taero and Tro are then determined at blocks 384 and 386 according to the respective expressions:

$$Taero = Nv^2 * K5, \text{ and}$$

$$Tro = K6$$

The block 388 is then executed to determine the new grade load term GL(NEW) according to the expression:

$$GL(NEW) = Tax - K7 - Taero - Taccel - Tro$$

The block 390 is then executed to develop a filtered grade load term GLfilt according to the expression:

$$GLfilt = GLfilt + K8(GL(NEW) - GLfilt)$$

where K8 is a gain constant.

The Fuzzy Downshift Logic flow diagram of FIGS. 7a–7d determines and sums the values of the five control rules, determines the appropriate pulldown speed ratio, and develops an inference-based pulldown request. The truth values for the six parameter conditions: TPS LOW, VSLOW, GLNEG, RKTIML, DECTIML and CACCTIML are determined at instruction blocks 450 and 460–468 by table look-up substantially as described above in reference to the the graphs of FIGS. 3a–3f.

As noted at block 460, the VSLOW parameter is determined as a function of the fuzzy logic vehicle speed term FZVSPEED. Normally, this term is set equal to the measured vehicle speed Nv, as indicated at block 458. Under the condition defined by blocks 452-456, however, the execution of block 458 is skipped, and FZVSPEED is temporarily held at its entry value. This condition, defined by (1) a fuzzy-logic induced pulldown being in effect, (2) the engine throttle setting being less than a reference value REFTPS, and (3) the actual vehicle speed Nv increasing, occurs after climbing a hill and beginning a subsequent descent. In this condition, an upshift is undesired, and when detected, the current vehicle speed value FZVSPEED is frozen so that the control rules which include VSLOW are maintained at a relatively high value. This operates to maintain the fuzzy pulldown until the driver increases the throttle setting above the reference REFTPS, indicating that engine braking is no longer desired.

The blocks 470-474 apply the VSLOW and GLNEG truth values determined at blocks 460 and 462 to the first control rule: VSLOW AND GLNEG. The lower of the two truth values, determined at block 470, satisfies the logical AND operator, and is suitably weighted by gain factor K1 and stored in the control rule truth term TRUTH1. The blocks 476-480 apply the TPSLOW and GLNEG truth values determined at blocks 450 and 462 to the second control rule: TPSLOW AND GLNEG. The lower of the two truth values, determined at block 476, is suitably weighted by gain factor K2 and stored in the control rule truth term TRUTH2. The blocks 482-492 apply the VSLOW, GLNEG and BRKTIML truth values determined at blocks 460, 462 and 464 to the third control rule: BRKTIML AND GLNEG AND VSLOW.

The lowest of the three truth values, determined by blocks 482-486, is suitably weighted by gain factor K3 and stored in the control rule truth term TRUTH3. The blocks 494-502 apply the VSLOW and DECTIML truth values determined at blocks 460 and 466 to the fourth control rule: VSLOW AND DECTIML. The lower of the two truth values, determined at block 494, is suitably weighted by gain factor K4 and stored in the control rule truth term TRUTH4 as well as the temporary variable x. The blocks 504-508 apply the VSLOW, DECTIML and CACCTIML truth values determined at blocks 460, 466 AND 468 to the fifth and final control rule: VSLOW AND DECTIML AND CACCTIML. The lowest of the three truth values, determined in conjunction with the variable x at block 504, is suitably weighted by gain factor K5 and stored in the control rule truth term TRUTH5. Finally, the block 510 is executed to sum the control rule truth terms TRUTH1, TRUTH2, TRUTH3, TRUTH4 and TRUTH5 in the term TRUTHSUM.

The blocks 512-534 are then executed to determine the value of FUZZQUAD, which defines the pulldown gear corresponding to the value of TRUTHSUM. The value of FUZZQUAD, initialized to four, represents the highest available forward speed ratio, based on the value of TRUTHSUM. If TRUTHSUM is less than or equal to 64, as determined by blocks 516-520, the block 522 is executed to set FUZZQUAD to four; if TRUTHSUM is between 64 and 128, block 524 is executed to set FUZZQUAD to three; and if TRUTHSUM is greater than or equal to 128, the block 526 is executed to set FUZZQUAD to two. If the FUZZQUAD is set to three or two, as determined at block 518 and 512, respectively, the respective block 530 or 532 is executed to increase the value of TRUTHSUM by a hysteresis creating amount K. The hysteresis operates to reduce the likelihood of oscillation between different values of FUZZQUAD when TRUTHSUM has a value of approximately 64 or 128.

The blocks 536-556 concern determination of the term FUZZQ2, which is the inference-based pulldown command generated by the Fuzzy Downshift Logic. In other words, FUZZQUAD represents the pulldown quadrant which appears to be desired per the inference-based control rules, while FUZZQ2 represents the pulldown quadrant actually commanded by the Fuzzy Downshift Logic. As described below in reference to the flow diagram of FIG. 9, the Desired Ratio Determination Logic utilizes the state of FUZZQ2 in determining the desired ratio Rdes.

The block 536 is first executed to compare the states of FUZZQUAD and FUZZQ2. If FUZZQUAD is less than FUZZQ2, the blocks 538-546 are executed to determine if FUZZQ2 should be decremented to a lower pulldown quadrant. If a coast downshift is in progress, as determined at block 538, the state of FUZZQ2 is not changed. If a coast downshift is not in progress and the blocks 540-544 are satisfied, the block 546 is executed to set FUZZQ2 equal to FUZZQUAD, effectively decrementing FUZZQ2 by one or more quadrants.

The block 540 determines if the desired pulldown quadrant FUZZQUAD agrees with the shift pattern result Rdes. If so, the block 546 is executed to set the inference-based pulldown command FUZZQ2 equal to FUZZQUAD. If not, the blocks 542-544 are executed to detect a condition in which braking activity has just ceased. The block 542 determines if either of the brake-dependent control rule values (that is, TRUTH3 and TRUTH4) are at least partially responsible for the TRUTHSUM value giving rise to the need for manual pulldown operation. If not, block 546 is executed to set FUZZQ2 equal to FUZZQUAD, as above. If so, but the brake is now released, as determined at block 544, the execution of block 546 is skipped since further downshifting would not be appropriate. Significantly, the control does not modify the TRUTHSUM and FUZZQUAD values in this situation. Thus, if the driver subsequently reapplies the brakes, the inference-based pulldown shift will occur without delay.

If FUZZQUAD is greater than FUZZQ2, the blocks 548-556 are executed to update the fuzzy logic speed value FZVSPEED to the measured speed Nv and to determine if FUZZQ2 should be incremented to a higher pulldown quadrant. If an inference-based pulldown is not required—in other words, if the shift pattern is requesting the inference-based pulldown command FUZZQ2—the block 546 is executed to immediately increment the indicated pulldown quadrant by setting FUZZQ2 equal to FUZZQUAD. The above condition is determined at block 550 by the status of the FUZZY ACTIVE flag, described below in reference to the flow diagram of FIG. 9. If an inference-based pulldown is required and the delay timer FZQDELAY has been satisfied, as determined at blocks 550-552, the blocks 554 and 556 are executed to increment FUZZQ2 by one quadrant and to clear or reset the delay timer FZQDELAY. It will be seen that the delay timer, described below in reference to the flow diagram of FIGS. 8a-8b, thereby serves to separate the upshifts in time, improving the shift pleaseability.

Figure 8A:
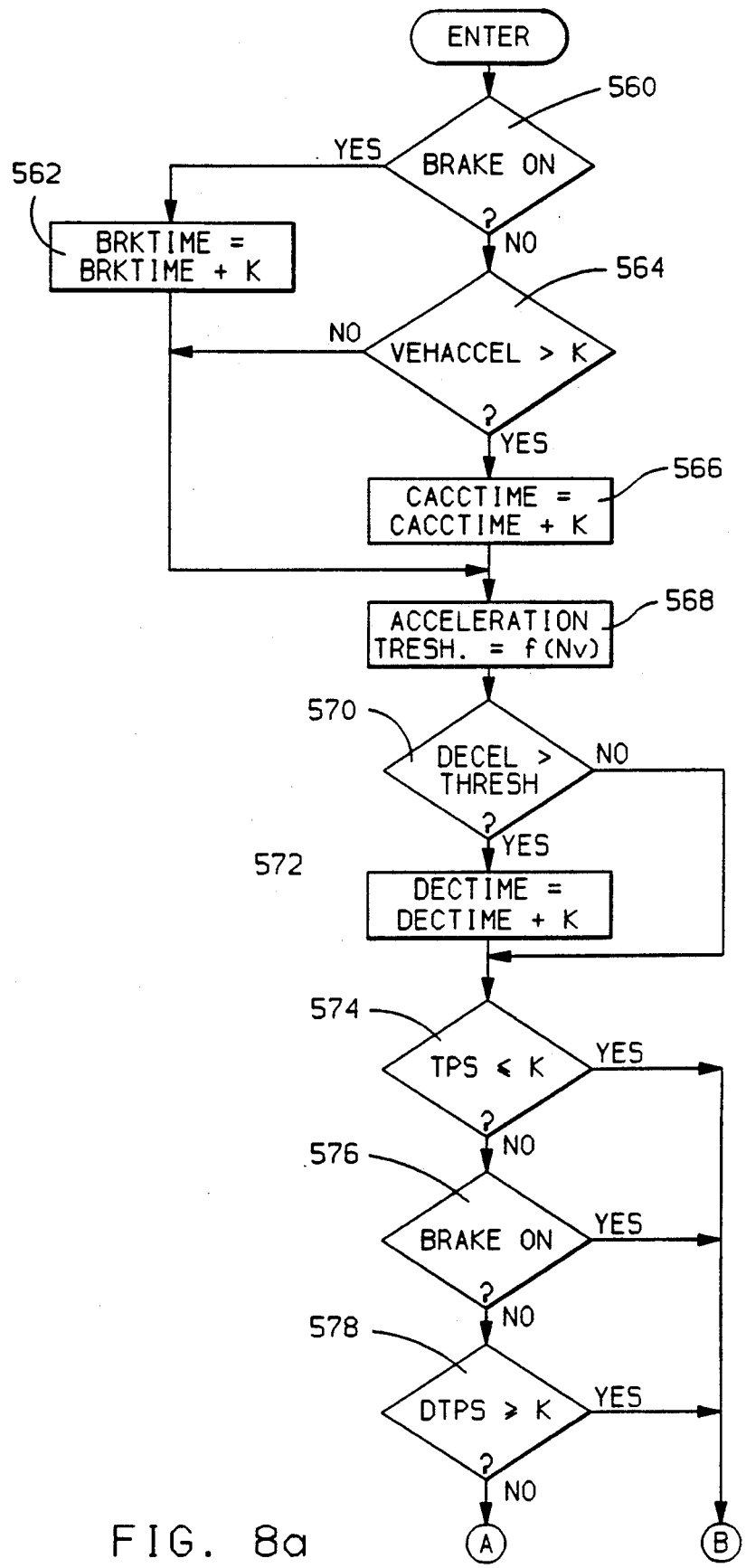
Figure 8B:
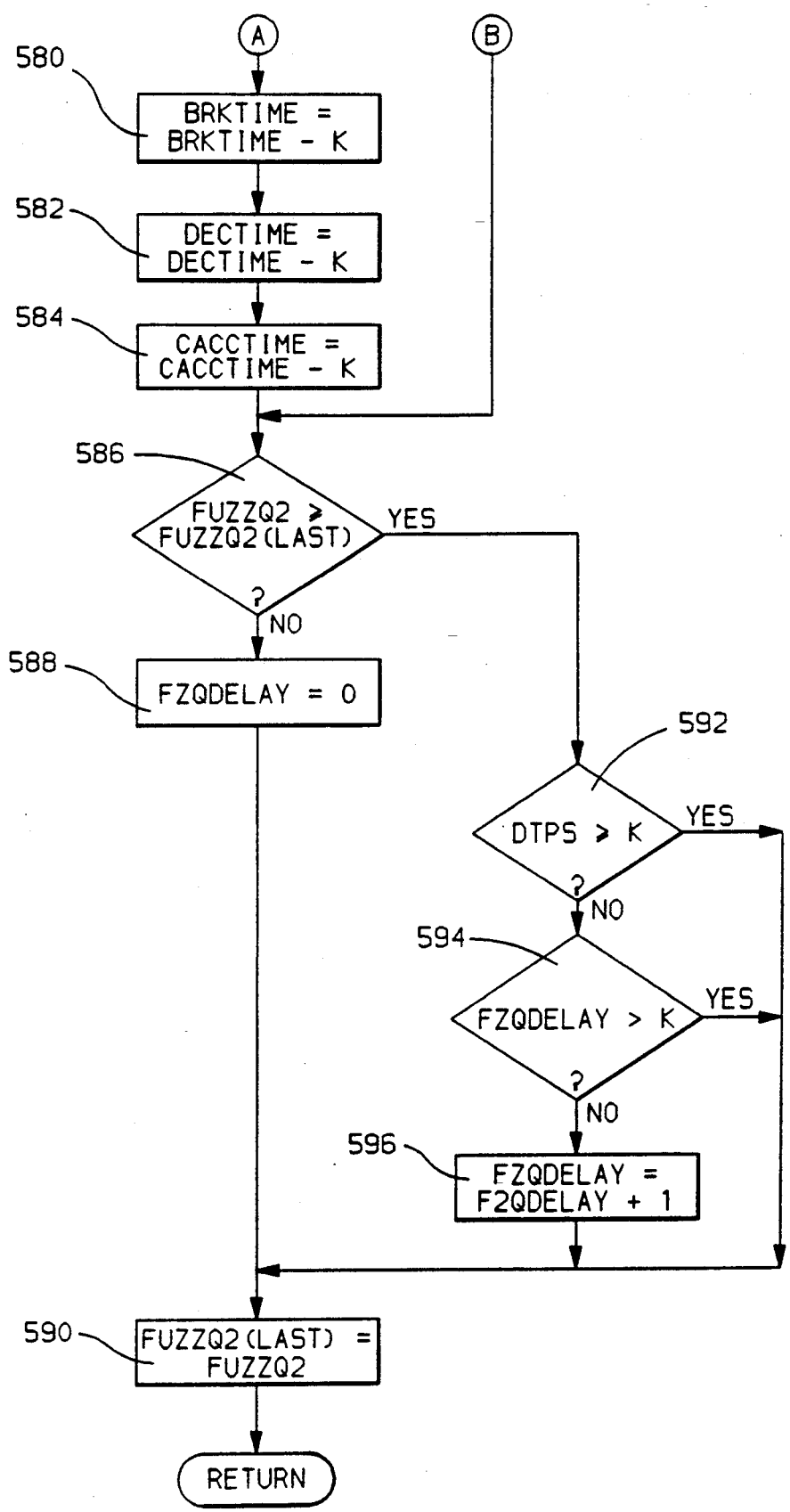

The Fuzzy Logic Counter Processing Logic flow diagram of FIGS. 8a-8b serves to update certain of the inference-based parameters and timers utilized in the Fuzzy Downshift Logic of FIGS. 7a-7d. The brake, deceleration and coast-acceleration timers are progressively increased in value so long as the respective condition is true and progressively decreased in value whenever the condition is not true. The blocks 560–572 are directed to increasing the timer values, while the blocks 574–584 are directed to decreasing the timer values.

If the vehicle service brakes are applied, as determined at block 560, the block 562 is executed to increment brake timer term BRKTIME. If the brakes are not applied, and the vehicle acceleration exceeds a minimum reference amount K, as determined at blocks 560 and 564, the block 566 is executed to increment the coast acceleration timer term CACCTIME. If the vehicle deceleration exceeds a vehicle speed dependent threshold THRESH determined at block 568, as determined at block 570, the deceleration timer term DECTIME is incremented at block 572. The threshold is scheduled in relation to the vehicle speed so that increased deceleration is required at lower vehicle speeds in order to increase the value of DECTIME.

The blocks 580–584 are executed to decrement all three timer terms unless at least one of the conditions defined by blocks 574–578 is met. The first condition, engine throttle position TPS less than a reference K, inhibits decrementing if the accelerator pedal is substantially released. The second condition, defined by block 576, inhibits decrementing of the timers when the service brakes are applied. The third condition defines a situation in which the brake is off and the engine throttle setting is increasing at a relatively high rate, a situation which occurs as the vehicle begins an ascent and the driver attempts to maintain a given vehicle speed. In this situation, decrementing the timer values is inhibited since upshifting would not be appropriate. If none of the conditions are met—that is, the throttle setting is non-zero but reasonably steady, and the brakes are not applied—a quasi-steady-state condition is indicated, and the timer values are decremented, reducing the values of TRUTH3, TRUTH4 and TRUTH5.

The blocks 586–596 control the value of the delay timer term FZQDELAY. At block 586, the current state of FUZZQ2 is compared with its state after the previous execution of the Fuzzy Logic Counter Processing Logic, designated as FUZZQ2(LAST). If the state of FUZZQ2 is lower than the previous state, upshifting is not required and the blocks 588–590 are executed to clear/reset the delay timer term FZQDELAY and to reinitialize the previous state term FUZZQ2-(LAST) in accordance with the current value of FUZZQ2. If the state of FUZZQ2 is at least as high as the previous state, the blocks 592–594 and 590 are executed to determine if the delay timer term FZQDELAY should be incremented, and then to reinitialize the previous state term FUZZQ2(LAST) as described above. Essentially, the timer term FZQDELAY is incremented at block 596 if (1) the change in engine throttle position DTPS is less than a reference K, and (2) the current value of the term is less than or equal to the reference time defined at block 552 of FIG. 7d.

The DTPS condition of block 592 is included to prevent incrementing of the delay timer when the vehicle nears the bottom of a hill and the driver begins increasing the throttle to climb another hill. In this situation, an upshift would be inappropriate as noted above in reference to block 578 of FIG. 8a, and the control responds by further delaying an upshift; see FIG. 7d, blocks 552–554.

Figure 9:
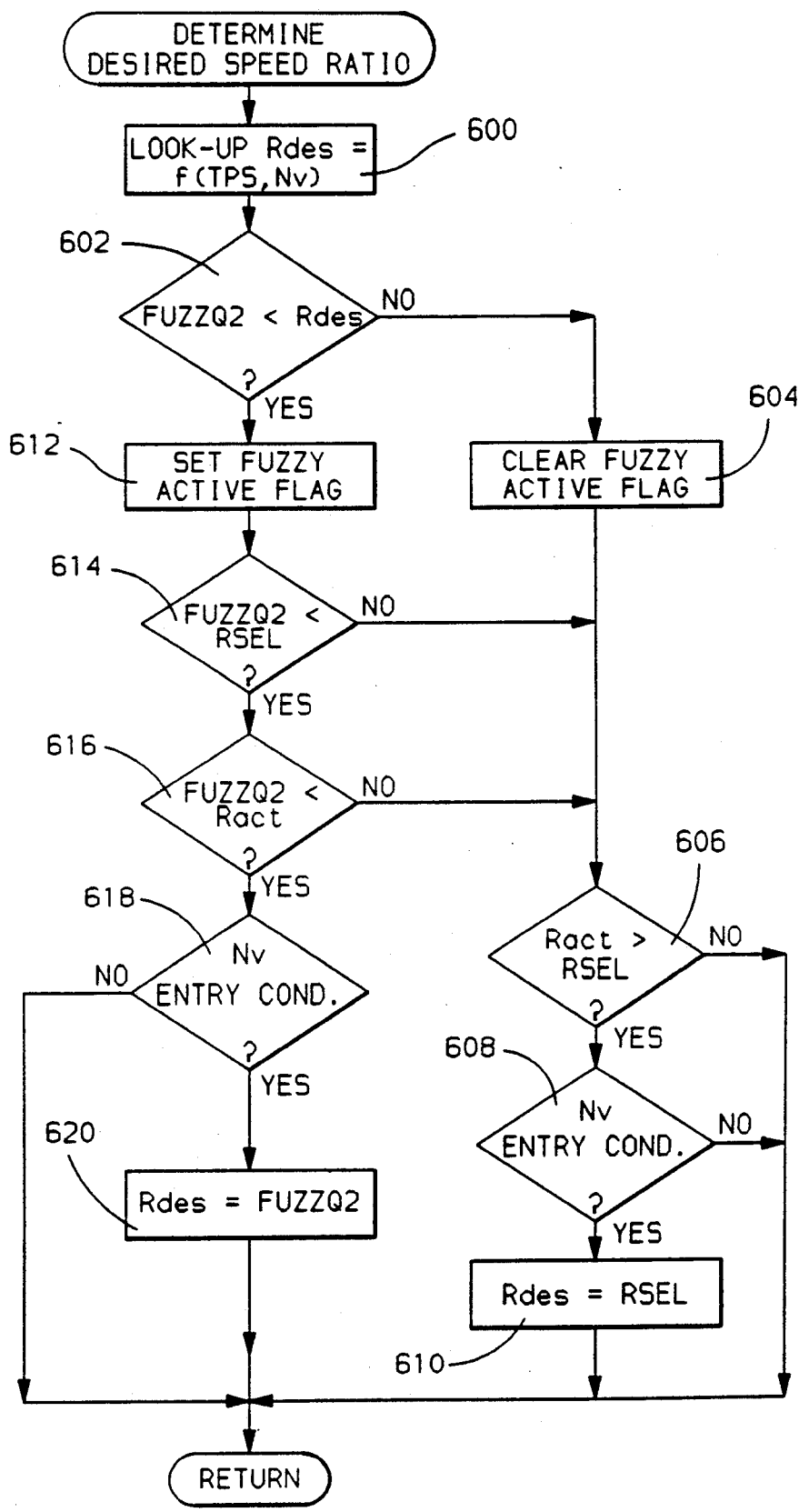

Referring to the Desired Speed Ratio Determination flow diagram of FIG. 9, the block 600 is first executed to address the normal shift pattern look-up table as a function of engine throttle position TPS and vehicle speed Nv to determine the desired speed ratio Rdes. If the inference-based pulldown command FUZZQ2 is at least as high as the scheduled ratio Rdes, as determined at block 602, the blocks 604–610 are executed to clear set the FUZZY ACTIVE flag (referenced above with respect to block 550 of FIG. 7d), and to compare Rdes with the manual range selector position RSEL. Essentially, the desired ratio Rdes is reset in accordance with RSEL so long as (1) the actual ratio Ract is higher than RSEL, and (2) engine speed constraints would not be violated by shifting to the ratio designated by RSEL.

If the inference-based pulldown command FUZZQ2 is less than Rdes, the block 612 is executed to set the FUZZY ACTIVE flag. If FUZZQ2 is at least as great as the range selector position RSEL or the actual ratio Ract, as determined at blocks 614–616, the blocks 606–610 are executed to reset the desired ratio Rdes as described above. Otherwise, the block 620 is executed to set the desired ratio Rdes equal to the inference-based pulldown command FUZZQ2 unless the engine speed constraints would be violated, as determined at block 618.

In the manner described above, the control of this invention automatically initiates manual pulldown shift operation based on the inferred need for such operation. Drivers who are unfamiliar with the recommended operating procedures for driving in hilly terrain will enjoy the operational advantages (such as reduced shift busyness and increased brake life) which were heretofore attained only by experienced drivers.

While the invention is described in reference to the illustrated embodiment, it is expected that various modifications will occur to those skilled in the art, and it should be understood that controls incorporating such modifications may fall within the scope of this invention, which is defined by the appended claims.

The embodiments of the invention in which an exclusive property or privilege is claimed are defined as follows:

1. In a motor vehicle having an automatic transmission providing a plurality of engageable speed ratios ranging from a lowest speed ratio to a highest speed ratio, and a control which normally operates to select a speed ratio to be engaged based on vehicle speed and load, a method of operation comprising the steps of:
   forming a plurality of inference signals which are indicative of the need to engage a speed ratio lower than said highest speed ratio, based on diverse measured operating parameters of said vehicle;
   selecting a maximum speed ratio based on an aggregate of said plurality of inference signals; and
   engaging a speed ratio in accordance with the lower of said maximum speed ratio and the speed ratio selected by said control.

2. The method of operation set forth in claim 1, wherein the step of forming a plurality of inference signals includes the steps of:
   determining vehicle speed and grade load;
   forming a first truthfulness indication of the determined vehicle speed with respect to a predetermined criteria of low vehicle speed;
   forming a second truthfulness indication of the determined grade load with respect to a predetermined criteria of negative grade load; and forming an inference signal in relation to the lower of said first and second truthfulness indications.

3. The method of operation set forth in claim 1, wherein the vehicle includes an engine connected to drive the vehicle through the transmission, and a throttle which is positioned to control output torque of the engine, the step of forming a plurality of inference signals including the steps of:
   determining vehicle speed and throttle position;
   forming a first truthfulness indication of the determined vehicle speed with respect to a predetermined criteria of low vehicle speed;
   forming a second truthfulness indication of the determined throttle position with respect to a predetermined criteria of relatively low throttle position; and
   forming an inference signal in relation to the lower of said first and second truthfulness indications.

4. The method of operation set forth in claim 1, wherein the vehicle includes operator activated service brakes for reducing the vehicle speed, and the step of forming a plurality of inference signals includes the steps of:
   determining vehicle speed, grade load, and time of brake activation;
   forming a first truthfulness indication of the determined vehicle speed with respect to a predetermined criteria of low vehicle speed;
   forming a second truthfulness indication of the determined grade load with respect to a predetermined criteria of negative grade load;
   forming a third truthfulness indication of the determined time of brake activation with respect to a predetermined criteria of relatively long brake activation time; and
   forming an inference signal in relation to the lowest of said first, second and third truthfulness indications.

5. The method of operation set forth in claim 1, wherein the step of forming a plurality of inference signals includes the steps of:
   determining vehicle speed and time of vehicle deceleration in excess of a predetermined amount;
   forming a first truthfulness indication of the determined vehicle speed with respect to a predetermined criteria of low vehicle speed;
   forming a second truthfulness indication of the determined time of vehicle deceleration with respect to a predetermined criteria of relatively long time of vehicle deceleration; and
   forming an inference signal in relation to the lower of said first and second truthfulness indications.

6. The method of operation set forth in claim 1, wherein the step of forming a plurality of inference signals includes the steps of:
   determining vehicle speed, time of vehicle deceleration in excess of a predetermined amount, and time of vehicle acceleration during coasting;
   forming a first truthfulness indication of the determined vehicle speed with respect to a predetermined criteria of low vehicle speed;
   forming a second truthfulness indication of the determined time of vehicle deceleration in excess of a predetermined amount with respect to a predetermined criteria of relatively long time of deceleration;
   forming a third truthfulness indication of the determined time of vehicle acceleration during coasting with respect to a predetermined criteria of relatively long coast acceleration time; and
   forming an inference signal in relation to the lowest of said first, second and third truthfulness indications.

7. The control method set forth in claim 1, wherein the vehicle includes operator activated service brakes, the step of forming a plurality of inference signals including the step of:
   measuring a time of brake activation by periodically incrementing a brake time signal while activation of said service brakes is detected, and periodically decrementing said brake time signal while deactivation of said service brakes is detected.

8. The control method set forth in claim 7, wherein the vehicle includes an engine connected to drive the vehicle through the transmission, and a throttle which is positioned to control output torque of the engine, the control including the step of:
   detecting a condition of demanded acceleration in relation to the rate of increase in the position of said throttle; and
   suspending the decrementing of said brake time signal so long as said condition of demanded acceleration is detected.

9. The control method set forth in claim 1, wherein the vehicle includes operator activated service brakes, an engine connected to drive the vehicle through the transmission, and a throttle which is positioned to control output torque of the engine, the step of forming a plurality of inference signals including the step of:
   measuring a time of vehicle deceleration by periodically incrementing a deceleration time signal so long as vehicle deceleration exceeds a threshold deceleration, and periodically decrementing said deceleration time signal while said service brakes are deactivated and the position of said throttle exceeds a reference position.

10. The control method set forth in claim 9, wherein said threshold deceleration is increased with decreasing vehicle speed.

11. The control method set forth in claim 9, including the steps of:
    detecting a condition of demanded acceleration in relation to the rate of increase in the position of said throttle; and
    suspending the decrementing of said deceleration time signal so long as said condition of demanded acceleration is detected.

12. The control method set forth in claim 1, wherein the vehicle includes operator activated service brakes, an engine connected to drive the vehicle through the transmission, and a throttle which is positioned to control output torque of the engine, the step of forming a plurality of inference signals including the step of:
    measuring a time of coast acceleration by periodically incrementing a coast acceleration time signal so long as said service brakes are deactivated and vehicle acceleration exceeds a threshold, and periodically decrementing said coast acceleration time signal when said service brakes are deactivated and the position of said throttle exceeds a reference position.

13. The control method set forth in claim 12, including the steps of:
    detecting a condition of demanded acceleration in relation to the rate of increase in the position of said throttle; and suspending the decrementing of said coast acceleration time signal so long as said condition of demanded acceleration is detected.

14. The control method set forth in claim 1, wherein the step of engaging a speed ratio includes the step of:
   delaying an increase in the selected maximum speed ratio when the aggregate of said inference based signals corresponds to a speed ratio higher than the selected maximum speed ratio until a predetermined period of time has elapsed since a previous change in said selected maximum speed ratio.

15. The control method set forth in claim 14, wherein the vehicle includes an engine connected to drive the vehicle through the transmission, and a throttle which is positioned to control output torque of the engine, the control including the steps of:
   detecting a condition of demanded acceleration in relation to the rate of increase in the position of said throttle; and
   additionally delaying an increase in the selected maximum speed ratio for as long as said condition of demanded acceleration is detected.

16. The control method set forth in claim 1, wherein the vehicle includes operator activated service brakes, and certain of said measured operating parameters depend on activation of said service brakes, the step of engaging a speed ratio including the steps of:
   detecting a braking condition wherein inference signals based on said certain measured operating parameters indicate a need to engage a speed ratio lower than said highest speed ratio; and
   in response to the detection of said braking condition, suspending a decrease in the selected maximum speed ratio when the aggregate of said inference signals corresponds to a speed ratio lower than the selected maximum speed ratio so long as brake deactivation is also detected.

* * * * *